United States Patent [19]

Hazebrook

[11] Patent Number: 5,007,881
[45] Date of Patent: Apr. 16, 1991

[54] MULTI-COMPONENT, MULTI-SEGMENT, NON-FLEXIBLE BOOT FOR MECHANICAL JOINT

[75] Inventor: Daniel W. Hazebrook, Detroit, Mich.

[73] Assignee: GKN Automotive, Inc., Auburn Hills, Mich.

[21] Appl. No.: 832,865

[22] Filed: Feb. 24, 1986

[51] Int. Cl.$^5$ ............................................. F16D 3/84
[52] U.S. Cl. .................................... 464/171; 464/170
[58] Field of Search .................... 277/212 F, 212 FB; 464/170, 171, 173, 906

[56] References Cited

U.S. PATENT DOCUMENTS

| | | | |
|---|---|---|---|
| 2,211,388 | 8/1940 | Salvetti | 464/171 X |
| 2,544,546 | 3/1951 | Roos | 464/171 X |
| 2,847,837 | 8/1958 | Baker | 464/171 |
| 3,075,370 | 1/1963 | Kings | 464/171 |
| 3,260,071 | 7/1966 | Westercamp | 464/171 |
| 3,418,828 | 12/1968 | Carns | 464/171 |
| 3,733,854 | 5/1973 | Young et al. | 464/171 |
| 4,238,936 | 12/1980 | Devos | 464/171 X |
| 4,627,826 | 12/1986 | Juziuk et al. | 464/171 |

Primary Examiner—Daniel P. Stodola

[57] ABSTRACT

A sealing boot for sealing a power transmitting mechanical joint, especially a mechanical joint which is subject to angular articulation between its input shaft and output shaft. The mechanical joint has an outer race which is a part of its output shaft, and the outer race has an external spherical surface. The sealing boot has a segment which is made up of concentric inner and outer non-flexible components which surrounds a portion of the outer race, and the inner component of the two-component segment sealingly engages the external spherical sealing surface of the outer race. The two-component non-flexible segment of the boot and the outer race of the joint can be articulated relative to one another without breaking the seal therebetween. In the preferred embodiment the remainder of the boot constitutes a non-pleated, funnel-shaped, non-flexible second boot segment, the enlarged end of which is generally spherically-shaped and is received in a spherical groove defined by the inner component and the outer component of the two-component non-flexible portion and the other end of which sealingly engages the input shaft of the mechanical joint. A portion of the articulation required during normal driving is obtained by the movement of the enlarged end of the second boot segment in the spherical groove defined by the inner and outer components of the two-component boot segment. Additional articulation is provided by the spherical sliding of the two-component boot segment on the spherical surface of the outer race after the second boot segment bottoms in the spherical groove of the two-component boot segment.

4 Claims, 1 Drawing Sheet

MULTI-COMPONENT, MULTI-SEGMENT, NON-FLEXIBLE BOOT FOR MECHANICAL JOINT

CROSS-REFERENCE TO RELATED APPLICATION

This application is directed to an improved boot or seal for a power transmitting mechanical joint of the type described in co-pending U.S. Pat. application Ser. No. 702,051 which is assigned to the assignee of this application, the disclosure of which is incorporated herein by reference.

BACKGROUND OF THE INVENTION

1. Field of the Invention

This invention relates to a boot or seal for a power transmitting mechanical joint, especially for a joint which is subject to articulation during operation. More particularly, this invention relates to a boot or seal of the aforesaid type in which at least a portion of such boot is of a semi-rigid character. Specifically, this invention relates to a boot or seal for a constant velocity joint of the type used in driving a front wheel of a front wheel drive automotive vehicle, in which the portion of the seal or boot which surrounds the outer race of the joint is made up of concentric separate inner and outer components, each of which is of semi-rigid character.

2. Description of the Prior Art

Constant velocity drive joints are widely used in the automotive industry as means to transmit power from the transmission of a front wheel drive vehicle to the driven front wheels of the vehicle, with one or more of such joints being provided for each of the driven wheels. Each such drive joint must be sealed, of course, to maintain the necessary lubrication in place within the joint and to keep the joint free from contamination by dirt and other external contaminants.

The devices heretofore used to accomplish this sealing function, which are usually referred to as seals or boots, have usually been of a flexible construction, usually constructed of an elastomeric material and usually in a pleated configuration. Such flexible construction, however derived, gives the boot the ability to distort to accommodate articulation or angular movement of the normally axially aligned input and output shafts of the joint, an operational condition which can develop due to road vibration or cornering, for example, without breaking the seal of the joint during such articulation.

Flexible boots or seals for automotive constant velocity drive joints, as heretofore described, have been utilized quite extensively. However, these seals are quite expensive, and due to the fact that their dimensions readily change by virtue of their flexible nature, they must be installed using manual operations, which precludes the use of some cost-saving mechanical assembly techniques that rely on precise dimensions of the part being installed. Additionally, these flexible boots or seals, which are made from elastomeric materials, are subject to puncture in use due to road hazards and other forms of concentrated impacts, and these materials are known to be subject to degradation of properties when exposed to low temperatures or high temperatures of the type that can be encountered during the normal life of an automobile. Additionally, due to the pleated configuration of these flexible boots or seals, the interior volume, which must be filled with grease to properly lubricate the associated joint, requires a rather large volume of grease for that purpose. Furthermore, many elastomeric materials are subject to degradation when exposed to grease, and the grease sensitivity further limits the useful life of such flexible seals.

The aforesaid co-pending U.S. Pat. application Ser. No. 702,051 describes a boot or seal for a mechanical joint that has a non-flexible organic portion with a part-spherical inner surface that articulatingly seals on the part-spherical outer surface of the outer race of the universal joint, which outer race is usually metallic. The non-flexible organic first portion is of integral construction and has a part-spherical slot therein which sealingly receives a second portion which articulates in such slot.

In the embodiment of FIG. 1 of the aforesaid co-pending U.S. Pat. application Ser. No. 702,051, the non-flexible organic portion of the boot or seal of the mechanical joint depicted therein is integrally formed, which leads to uniform hardness and other properties throughout such non-flexible organic portion of the boot or seal. However, it has now been discovered that the performance of the non-flexible organic portion of the boot or seal of the mechanical joint depicted in FIG. 1 of the aforesaid co-pending U.S. Pat. application Ser. No. 702,051 can be improved by constructing such portion from at least a pair of non-flexible organic portions, components, or segments, each of which is selected from a slightly different non-flexible organic material to provide differing hardness and other properties in each such component to optimize the performance of each such components in the mechanical joint in which it is used.

SUMMARY OF THE INVENTION

Accordingly, pursuant to the present invention there is provided a multi-component seal or boot for a mechanical joint, such as a constant velocity front wheel drive joint for an automotive vehicle. This multi-component boot is manufactured, at least in part, from at least a pair of semi-rigid materials, each of which, preferably, is a different semi-rigid polymeric material, such as a thermosetting material, the assembled joint with such a boot having improved performance properties relative to an assembled joint that uses a single, integral, boot segment formed from a semi-rigid polymeric material. Additionally, such a boot has improved properties relative to its prior art flexible counterpart in that the semi-rigid portion of the present invention is more puncture resistant than an elastomeric boot, it is more tolerant of high and low temperatures, and it is less subject to degradation in contact with grease.

The multi-component semi-rigid portion or first semi-rigid boot segment of the boot of the present invention has concentric first and second components, each of which has an open end portion which faces the output end of the joint, and this open end portion surrounds the joint end portion of the outer race of the joint, The open end portion of each boot component has a generally spherical configuration, the inner of such components sealingly engaging a spherical outer surface on the outer race of the joint. This surface-to-surface sealing relationship between the semi-rigid end portion of the inner boot component and the outer race of the joint permits a predetermined and acceptable degree of articulation between the first semi-rigid boot segment and the outer race without breaking the seal therebetween. To maintain the desired assembled relationship between the inner component of the multi-component boot and the outer race of the joint, a slight interference or snap fit is provided therebetween by making the diameter of the open end of the first component of the boot slightly less than the diameter of its spherical sealing surface, such first component of the boot having sufficient elasticity to expand over the outer race of the joint and to remain securely in place after attachment to the outer race by virtue of the tensile stresses developed with the inner boot component due to such interference fit.

In the preferred embodiment of the present invention the boot is constructed of a pair of semi-rigid, axially aligned, open-ended boot segments including the multi-component segment as previously described, the inner component of which seals in surface-to-surface relationship against the spherical outer surface of the outer race of the joint. Such a boot also includes, as a second semi-rigid segment, a non-pleated boot segment. Articulation between the first and second semi-rigid boot segments is obtained by providing the first boot segment with a spherical annular groove at its input end, which spherical annular groove is defined by a clearance between the inner component and the outer component of the first boot segment, and by providing the second boot segment with a spherical output free end which is received in the spherical annular groove of the first semi-rigid boot segment in surface-to-surface sealing relationship therewith.

Accordingly, it is an object of the present invention to provide an improved boot for sealing a mechanical power transmitting joint.

More particularly, it is an object of the present invention to provide an improved boot for sealing a power transmitting mechanical joint whose input and output members are subject to articulation relative to one another.

More particularly, it is an object of the present invention to provide an improved boot for sealing a constant velocity drive joint.

More particularly, it is an object of the present invention to provide an improved boot for sealing a constant velocity drive joint used to drive a front wheel of a front wheel drive automotive vehicle.

It is a further object of the present invention to provide a boot for sealing a constant velocity drive joint of a front wheel drive automotive vehicle in which the boot has a multi-component semi-rigid portion, each component of which is formed from a semi-rigid material, such components being disposed concentrically with one another, the inner of such concentric components sealingly engaging the outer spherical sealing surface of a member of the joint in a way which permits articulation between such multicomponent portion of the boot and such member of the joint.

Other objects and advantages of this invention will become apparent from the following detailed description taken in conjunction with the accompanying drawings.

DETAILED DESCRIPTION OF THE PREFERRED EMBODIMENT

Figure 1:
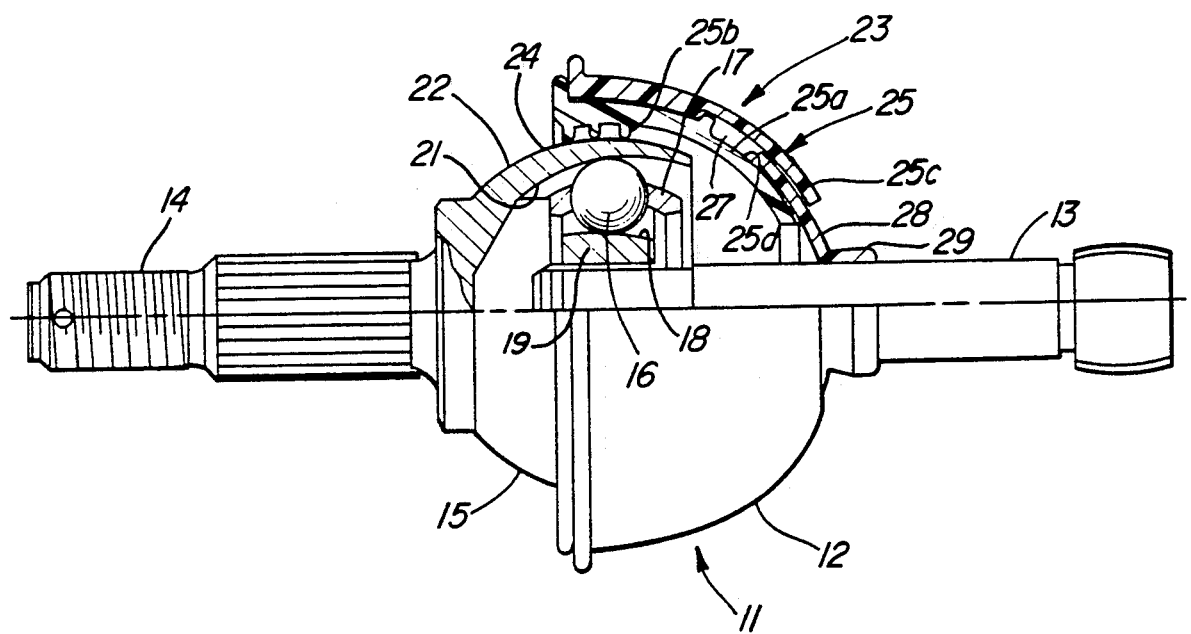
FIG. 1 is an elevational view, partially in section, of a constant velocity drive joint having a preferred embodiment of a sealing boot according to the present invention.

FIG. 1 illustrates a constant velocity drive joint of the fixed or non-plunging type, indicated generally by reference numeral 11. The c.v. drive joint 11 receives power at an input end 12 from an input shaft 13 and transmits power to a driven member, not shown, by an output shaft 14 which extends from an output end 15 of the c.v. drive joint 11. As is known in the prior art, power is transmitted from the input shaft 13 to the output shaft 14 by means of a circumferential series of balls 16, typically six in number, which are contained in a cage 17. The balls 16 roll on a spherical surface 18 of an inner race 19, which is keyed or otherwise secured to the input shaft 13 and, simultaneously, the balls 16 roll on a spherical inner surface 21 of an outer race 22, which constitutes an integral part of the output shaft 14. The member that is made up of the output shaft 14 and the outer race are formed integrally by forging, for example.

In operation, the input shaft 13 and the output shaft 14 are subject to articulation or angular distortion from the normal axial orientation between these members, which is depicted in FIG. 1. In the case of a drive joint for driving a front wheel of a front wheel drive automobile, this articulation can be of the order of forty-five (45°) in each direction and can result, for example, from normal road vibrations and bumps encountered by such a vehicle and from the cornering of the vehicle. The c.v. drive joint 11 itself is quite capable of accommodating this degree of articulation due to the fact that the balls 16 are in rolling engagement with the spherical surfaces 18 and 21 of the inner and outer races 19 and 22, respectively.

The c.v. drive joint 11, as heretofore described, contains precision machined components which move relative to one another and, therefore, it must be kept lubricated and free from contamination by dirt and other contaminants that may be encountered in an automotive environment. To this end the c.v. drive joint 11 is provided with a boot, indicated generally at 23, to seal the interior of the c.v. drive joint 11. Of course, the boot 23 must be capable of accommodating the degree of articulation that the c.v. drive joint 11 itself is subject to without loss of the sealing characteristics of the boot 23 during or as a result of such articulation, and in an automotive application it should be capable of doing so for many years.

As previously noted, the c.v. drive joint 11 must be capable of accommodating a substantial degree of angular articulation between the input shaft 13 and the output shaft 14. For an automotive front wheel drive joint, this articulation may frequently reach approximately twenty degrees (20°) in each direction during normal driving and may occasionally reach approximately forty-five degrees (45°) in each direction during the severe conditions encountered in sharp turns. The necessary articulation of the boot 23 can be obtained by constructing the outer race 22 of the drive joint with a spherical outer surface 24 and by constructing the boot 23 from a pair of boot segments, one of such pair of boot segments having separate concentric inner and outer components. In the case of a forged outer race, the spherical outer surface 24 is preferably unmachined to reduce the cost thereof. The first of these boot segments is a two-component segment 25 which has an inner component 25a which is provided with radially inwardly extending ribs 25b that sealingly engage the spherical outer surface 24 of the outer race 22. It is also contemplated that the sealing boot of the present invention can be utilized with existing c.v. universal joints which utilize a cylindrical or other non-spherical outer race. In such a case, a plastic or other type of fitment should be attached to the outer race, and this fitment should have a spherical outer surface for effecting surface-to-surface sealing engagement with the sealing boot. The two-component boot segment 25 also includes an outer component 25c which is disposed concentrically with respect to the inner boot component 25a in at least partial engagement therewith, the inner component 25a having a partial radially reduced thickness portion 25d near the input shaft 13 end of the c.v. drive joint. Thus, the outer surface of the partial radially reduced thickness portion of the inner component 25a, which is spherical in configuration, and the inner surface of the surrounding portion of the outer component 25c define a spherical groove 27 therebetween. The second segment of the boot 23 is a non-pleated, funnel-shaped, semi-rigid segment 28, the enlarged end of which is generally spherically-shaped and is sealingly received in the spherical groove 27. The other end of the segment 28 has a short cylindrical section 29 which sealingly surrounds and engages the input shaft 13.

The articulation of the c.v. joint 11 is partially accommodated by the articulation of the free end of the non-pleated, funnel-shaped, semi-rigid segment 28 within the spherical groove 27. This articulation preferably is sufficient to accommodate all bumps and turning vibrations which may be encountered during normal service of the drive joint, for example, up to approximately twenty degrees (20°) in each direction in an automotive front wheel drive joint. The dimensions of the enlarged end of the non-pleated, funnel-shaped, semi-rigid segment 28 and the spherical groove 27 are such that the non-pleated, funnel-shaped, semi-rigid segment 28 will bottom in the spherical groove 27 when this degree of articulation has been reached by contacting the portion of the inner component 25a that is located inwardly of the radially reduced thickness portion 25d. Further, articulation is then obtained by the spherical sliding of the inner component 25a and the outer component 25c, and the two-component segment 25, in unison, around the spherical outer surface 24 of the outer race 22. This articulation can accommodate up to an additional approximately thirty degrees (30°) of articulation in each direction, which is at least five degrees (5°) more than is normally required, after the non-pleated, funnel-shaped, semi-rigid segment 28 has bottomed in the spherical groove 27 and, in an automotive front wheel drive joint, this additional or secondary articulation comes into play during the occasional instances of sharp turning and/or severe jounce or rebound.

Each of the inner component 25a and the outer component 25c of the two-component first boot segment 25 and the non-pleated, funnel-shaped, semi-rigid segment 28 respectively, of the boot 23 are manufactured from tough, puncture-resistant, non-elastomeric, or semi-rigid polymeric materials, and a polyurethane material has proven to be well suited for the manufacture of each of these segments. Preferably, the outer component 25c of the two-component boot segment 25 is formed from a material that is somewhat harder than the material used to form the inner component 25a to provide maximum puncture resistance in the outer component 25c and better sealing properties in the inner component 25a. When so manufactured, the boot 23 will be considerably more resistant to puncturing or tearing than the flexible, elastomeric boots of prior art drive joints, and it will have dimensions which will fall within precise tolerances, thus, lending itself to mechanical handling techniques during assembly where assembly labor costs can be reduced in that manner. Additionally, the boot 23 will be more resistant to the extremes of high and low temperatures that can be encountered during the normal life of an automotive front wheel drive joint, and it will be more resistant to degradation from contact with the grease contained in the c.v. drive joint 11. As another feature of the boot 23, the sliding movements of its non-pleated, funnel-shaped, semi-rigid segment 28 in the spherical groove 27 of the semi-rigid inner component 25c and of the semi-rigid outer component 25a on the spherical outer surface 24 of the outer race 22 will, inherently, be self-lubricating due to the fact that a portion of the inside surfaces of each of the non-pleated, funnel-shaped, semi-rigid and semi-rigid segment 28 and 25, respectively, are in contact with the grease in the drive joint, augmented by the centrifugal forces on the grease during the rotation of the drive joint which will tend to keep grease in contact with all portions of these grease exposed inside surfaces during periods of most frequent articulation of the drive joint.

Figure 2:
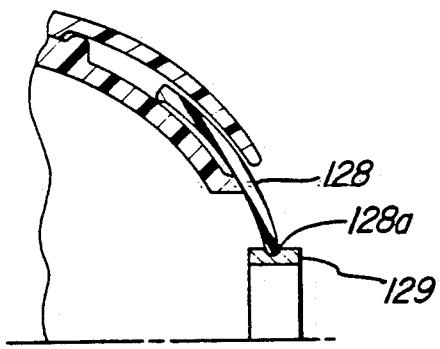
FIG. 2 is a fragmentary view, otherwise similar to FIG. 1, illustrating an alternative embodiment of a drive joint according to the present invention.

As another feature of the boot 23, the two-component segment 25, by virtue of its non-elastomeric character, can be retained in place on the spherical outer surface 24 of the outer race by means of a snap fit, without the need for a clamp or ring to assist in such retention. This will further reduce the cost of the parts involved in the manufacture of the drive joint and the cost of assembling such parts. Similarly, the non-pleated, funnel-shaped, semi-rigid segment 28 can be sealingly retained by means of a short cylindrical section 29 thereof which sealingly engages the input shaft 13 without the need for a clamp or groove to assist in such retention, thus, permitting a further reduction in material and assembly costs. Alternatively, as is shown in FIG. 2, a modified form of a non-pleated boot segment, which is identified by reference numeral 128, has its outermost end 128a bonded or otherwise secured to a separate cylindrical member 129, which cylindrical member, in turn, is adapted to securely engage an associated input shaft, not shown.

Various embodiments of the boot or seal of the present invention have been described in their application to a drive joint of the constant velocity type, because it is contemplated that the invention will have particular utility in that field. It is to be understood, however, that it is contemplated that this type of boot or seal can be used with other types of drive joints, such as tripod or ball contact types, or even non-constant velocity drive joints, such as Hookes or Cardan joints.

While a preferred and certain alternative embodiments of the present invention have been described, it will be apparent to those skilled in the art that changes may be made to the invention as described without departing from the spirit of the invention as defined in the appended claims. Accordingly, the description of this invention as heretofore set forth herein is intended to be illustrative of the principles of the invention and not to limit the scope thereof.

What is claimed is:

1. A boot for sealing a power transmitting mechanical joint, said joint comprising an input shaft, an output shaft, an outer race connected to one of said input shaft and said output shaft, and means to transmit power from the other of said input shaft and output shaft to said outer race, said outer race having a spherical outer surface, said input shaft and said output shaft being subject to articulation relative to one another during the operation of said mechanical joint, said boot comprising:

a first boot segment formed by at least two separate concentrically mounted components, at least one of said at least two concentrically mounted components being an inner component, at least one other of said at least two concentrically mounted components being an outer component, said outer component being formed from a first semi-rigid material, said inner component being formed from a second semi-rigid material, said first semi-rigid material having a hardness greater than said second semi-rigid material, said inner component being mounted to said spherical outer surface of said outer race, said inner component further surrounding and sealing engaging a portion of said spherical outer surface of said outer race, said outer component having a first portion mounted contiguous said inner component and a second portion spaced a predetermined distance from said inner component to define a spherical groove therebetween, said spherical groove facing one of said input shaft and said output shaft, said first portion being capable of articulating with respect to said outer race without the loss of the sealing relationship therewith; and a second boot segment formed from a semi-rigid material, said second boot segment having one end portion extended into said spherical groove defined by said inner and outer component of said first boot segment, said second boot segment further having an opposite end portion sealingly engaging the other of said input shaft and said output shaft, said one end portion further being sealing and slidingly received in said spherical groove of said first boot segment and being sealingly articulatable with respect to said first boot segment, said second boot segment together with said first boot segment, sealing the power transmitting mechanical joint between said outer race and the other of said input shaft and said output shaft to retain lubricant within said joint and to prevent dirt and other contaminants from entering said joint;

said spherical groove in said first boot segment having a predetermined length so that the articulation of said second boot segment with respect to said first boot segment causes said one end portion of said second boot segment to bottom in said spherical groove in said first boot segment, said boot being capable of further articulation by the articulation of said first boot segment with respect to said outer race of said power transmitting mechanical joint after said one end portion of said second boot segment bottoms in said spherical groove in said first boot segment.

2. A boot according to claim 1 wherein each of said first semi-rigid material and said second semi-rigid material is a polyurethane.

3. A boot according to claim 1 wherein said inner component of said first boot segment has a portion of reduced thickness, said portion of reduced thickness having a spherical outer surface, and further wherein said outer component of said first boot segment has a portion of reduced thickness, said portion of reduced thickness having a spherical inner surface, said spherical groove being defined by said spherical outer surface of said portion of reduced thickness of said inner component and said spherical inner surface of said portion of reduced thickness of said outer component.

4. A boot according to claim 1 wherein said second boot segment is generally funnel-shaped in configuration, said one end of said second boot segment comprising an enlarged end of the generally funnel-shaped second boot segment, said opposite end of said second boot segment further having a narrow, generally cylindrically shaped end mounted to said other of said input shaft and output shaft to sealingly engage said other of said input shaft and said output shaft.

* * * * *